United States Patent
Bermel

(10) Patent No.: US 7,125,504 B2
(45) Date of Patent: Oct. 24, 2006

(54) OPTICAL SWITCH MICROFILMS

(75) Inventor: Marcus S. Bermel, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 132 days.

(21) Appl. No.: 10/434,901

(22) Filed: May 9, 2003

(65) Prior Publication Data
US 2004/0091667 A1 May 13, 2004

Related U.S. Application Data

(60) Provisional application No. 60/425,898, filed on Nov. 13, 2002.

(51) Int. Cl.
*B29C 41/24* (2006.01)
*B29C 41/32* (2006.01)
*B29D 11/00* (2006.01)
*B32B 1/00* (2006.01)

(52) U.S. Cl. .............. 264/1.7; 264/171.1; 264/213; 264/217

(58) Field of Classification Search .......... 264/171.1, 264/173.11, 173.16, 213, 1.7; 427/384, 415
See application file for complete search history.

(56) References Cited

U.S. PATENT DOCUMENTS

| | | |
|---|---|---|
| 2,761,791 A | 9/1956 | Russell |
| 3,508,947 A | 4/1970 | Hughes |
| 4,113,360 A | 9/1978 | Baur et al. |
| 4,327,121 A | 4/1982 | Gray |
| 4,348,238 A | 9/1982 | Krall |
| 4,427,741 A | 1/1984 | Aizawa et al. |
| 4,569,863 A | 2/1986 | Koepke et al. |
| 4,572,849 A | 2/1986 | Koepke et al. |
| 4,604,425 A | 8/1986 | Ohmura et al. |
| 4,617,207 A | 10/1986 | Ueki et al. |
| 4,913,760 A | 4/1990 | Benson et al. |
| 5,219,510 A | 6/1993 | Machell et al. |
| 5,366,682 A | 11/1994 | Morikawa et al. |
| 5,514,466 A | 5/1996 | Yamada et al. |
| 5,645,766 A | 7/1997 | Shiro et al. |
| 5,695,694 A | 12/1997 | Iwata et al. |
| 5,743,980 A | 4/1998 | Hsieh et al. |
| 5,753,140 A | 5/1998 | Shigemura |
| 5,771,321 A | 6/1998 | Stern |
| 5,909,314 A * | 6/1999 | Oka et al. .................. 359/582 |
| 5,965,321 A | 10/1999 | Taylor et al. |
| 6,060,183 A | 5/2000 | Higashi et al. |
| 6,197,989 B1 | 3/2001 | Furukawa et al. |
| 6,245,382 B1 | 6/2001 | Shvartsman et al. |

(Continued)

FOREIGN PATENT DOCUMENTS

DE 269391 6/1989

(Continued)

OTHER PUBLICATIONS

JP Abstract 2000-047012.

(Continued)

*Primary Examiner*—Mathieu D. Vargot
(74) *Attorney, Agent, or Firm*—Mark G. Bocchetti; Paul A. Leipold

(57) ABSTRACT

A method of making a light diffusing microfilm, includes providing a carrier substrate; coating a coating fluid onto the carrier substrate; drying the coating fluid on the carrier substrate to form a releasable light diffusing microfilm on the carrier substrate; and separating the light diffusing microfilm from the carrier substrate.

28 Claims, 5 Drawing Sheets

U.S. PATENT DOCUMENTS

| | | |
|---|---|---|
| 6,262,788 B1 | 7/2001 | Hanrahan et al. |
| 6,512,562 B1 | 1/2003 | Kobayashi et al. |
| 6,582,789 B1 | 6/2003 | Sumi |
| 6,649,104 B1 | 11/2003 | Tadokoro et al. |
| 6,654,085 B1 * | 11/2003 | Koike et al. ............... 349/112 |
| 6,696,140 B1 * | 2/2004 | Suzuki ....................... 428/212 |
| 2002/0131172 A1 | 9/2002 | Hayashi et al. |
| 2002/0150722 A1 | 10/2002 | Suzuki |
| 2003/0214715 A1 | 11/2003 | Bermel |
| 2003/0215581 A1 | 11/2003 | Bermel |
| 2003/0215582 A1 | 11/2003 | Bermel |
| 2003/0215583 A1 | 11/2003 | Bermel |
| 2003/0215608 A1 | 11/2003 | Bermel |
| 2003/0215621 A1 | 11/2003 | Bermel |
| 2003/0215658 A1 | 11/2003 | Bermel |
| 2004/0058813 A1 | 3/2004 | Suzuki |

FOREIGN PATENT DOCUMENTS

| | | |
|---|---|---|
| DE | 051090 | 10/1996 |
| EP | 0 154 108 | 9/1985 |
| EP | 0 481 273 | 9/1991 |
| EP | 0 531 568 | 9/1991 |
| EP | 0 531 569 | 9/1991 |
| EP | 0 488 369 | 6/1992 |
| EP | 0 539 099 A2 | 4/1993 |
| EP | 0 656 285 A1 | 6/1995 |
| EP | 0 667 541 A2 | 8/1995 |
| EP | 0 951 057 A1 | 10/1999 |
| JP | 59-047268 | 3/1984 |

OTHER PUBLICATIONS

Surfactancts: Static and Dynami Surface Tension by Y.M. Tricot, "Liquid Film Coating, Scientific Principles and their Technological Implications", pp. 99-136, Edited by: S.F. Kisler & P.M. Schweizer, Chapman & Hall, 1997.

Japanese Patent Abstract 5-064821.
Japanese Patent Abstract 63-13100.
Japanese Patent Abstract 9-52240.
Japanese Patent Abstract 61-005986.
Japanese Patent Abstract 7-186163.
Japanese Patent Abstract 3-252625.
Japanese Patent Abstract 05-059310.
Japanese Patent Abstract 57-059961.
Japanese Patent Abstract 59-047268.
Japanese Patent Abstract 9-216241.
Japanese Patent Abstract 62-229205.
Japanese Patent Abstract 11-254594.
Japanese Patent Abstract 2002-090541.
Japanese Patent Abstract 62-064514.
Japanese Patent Abstract 10-080231.
Japanese Patent Abstract 11-005851.

* cited by examiner

OPTICAL SWITCH MICROFILMS

CROSS REFERENCE TO RELATED APPLICATIONS

This is a 111A application of Provisional Application Ser. No. 60/425,898, filed Nov. 13, 2002.

FIELD OF THE INVENTION

This invention relates generally to methods for manufacturing resin films and, more particularly, to an improved method for the manufacture of electromechanical switching films used in optical devices such as flat panel displays and other electronic displays.

BACKGROUND OF THE INVENTION

In U.S. Pat. No. 4,113,360 to Bauer, a display device is described comprising a first plate acting as a light guide or fluorescent material, a second plate positioned some distance apart from the first plate, and a thin movable microfilm situated between the two plates. As used herein microfilm means a thin flexible film less than 500 microns thick. The movable microfilm is flexible and can be made to locally contact the first plate and allow light to be transmitted from the first plate into the microfilm. If the microfilm is constructed to scatter the light, then movable microfilm acts as an optical switch to create bright and dark regions on the plates as the microfilm contacts or separates from the first plate, respectively. Rapid contact and separation between the microfilm and the first plate can be used to create gray regions.

As described in U.S. Pat. No. 4,113,360 to Bauer, the motion of the microfilm can be controlled by electrical means. For example, the microfilm may contain a very thin layer of indium tin oxide that permits an electrical charge to be applied to the microfilm. Similar conductive layers may be placed on the plates. An electrical bias between the plates and the microfilm may be used to move the microfilm toward or away from the light guide. Alternatively, U.S. Pat. No. 5,771,321 to Stern, describes an electromechanical means of controlling the movement of the microfilm.

Typically, the plates are rigid with a thickness on the order of millimeters and are comprised of clear materials such as glass or plastic (e.g. Plexiglas or polycarbonate). The microfilm, on the other hand, must be flexible and has thickness on the order of a micron. The microfilm may be comprised of resin material such as polycarbonate or polystyrene as suggested in U.S. Pat. No. 5,771,321 to Stern.

One drawback to preparing an information display panel using the optical switching device described above, is the need for an economical and simple method to manufacture the flexible microfilm. U.S. Pat. No. 5,771,321 to Stern describes a means of creating a rough surfaced microfilm by dipping a sheet of the microfilm into a solution of spheres. When the sheet is removed from the solution, the spheres are adhered to the sheet by surface tension. The microfilm is then heated to permanently fix the spheres to the sheet. The resulting irregular surface is said to be a light scattering surface. However, U.S. Pat. No. 5,771,321 to Stern does not describe how to prepare the thin precursor sheets. Moreover, U.S. Pat. No. 5,771,321 to Stern does not provide a method of controlling the roughness of each side of the microfilm independently. In addition, it may desirable to prepare a microfilm with an internal light scattering means as well as a surface scattering means. It is also desirable to have microfilms prepared with low birefringence. The preparation of such a microfilm for optical switch applications has not been described.

Resin microfilms used to prepare the various types of optical components described above are generally desired to have good light scattering abiltiy, transparency, high uniformity, and low birefringence. Moreover, these microfilms may be needed in a range of thickness depending on the final application.

In general, resin microfilms are prepared either by melt extrusion methods or by casting methods. Melt extrusion methods involve heating the resin until molten (approximate viscosity on the order of 100,000 cp), and then applying the hot molten polymer to a highly polished metal band or drum with an extrusion die, cooling the film, and finally peeling the film from the metal support. For many reasons, however, films prepared by melt extrusion are generally not suitable for optical applications. Principal among these is the fact that melt extruded films exhibit a high degree of optical birefringence. In the case of highly substituted cellulose acetate, there is the additional problem of melting the polymer. Cellulose triacetate has a very high melting temperature of 270–300° C., and this is above the temperature where decomposition begins. Films have been formed by melt extrusion at lower temperatures by compounding cellulose acetate with various plasticizers as taught in U.S. Pat. No. 5,219,510 to Machell. However, the polymers described in U.S. Pat. No. 5,219,510 to Machell are not the fully substituted cellulose triacetate, but rather have a lesser degree of alkyl substitution or have proprionate groups in place of acetate groups. Even so, melt extruded films of cellulose acetate are known to exhibit poor flatness as noted in U.S. Pat. No. 5,753,140 to Shigenmura. For these reasons, melt extrusion methods are generally not practical for fabricating many resin films including cellulose triacetate films. Rather, casting methods are generally used to manufacture these films. In general, resin films are prepared either by melt extrusion methods or by casting methods. Melt extrusion methods involve heating the resin until molten (approximate viscosity on the order of 100,000 cp), and then applying the hot molten polymer to a highly polished metal band or drum with an extrusion die, cooling the film, and finally peeling the film from the metal support. For many reasons, however, films prepared by melt extrusion are generally not suitable for optical applications. Principal among these is the fact that melt extruded films exhibit a high degree of optical birefringence. In the case of highly substituted cellulose acetate, there is the additional problem of melting the polymer. Cellulose triacetate has a very high melting temperature of 270–300° C., and this is above the temperature where decomposition begins. Films have been formed by melt extrusion at lower temperatures by compounding cellulose acetate with various plasticizers as taught in U.S. Pat. No. 5,219,510 to Machell. However, the polymers described in U.S. Pat. No. 5,219,510 to Machell are not the fully substituted cellulose triacetate, but rather have a lesser degree of alkyl substitution or have proprionate groups in place of acetate groups. Even so, melt extruded films of cellulose acetate are known to exhibit poor flatness as noted in U.S. Pat. No. 5,753,140 to Shigenmura. For these reasons, melt extrusion methods are generally not practical for fabricating many resin films including cellulose triacetate films used to prepare protective covers and substrates in electronic displays. Rather, casting methods are generally used to manufacture these films.

A prior art method of casting resin microfilms is illustrated in FIG. 8. As shown in FIG. 8, a viscous polymeric dope is delivered through a feed line 200 to an extrusion hopper 202 from a pressurized tank 204 by a pump 206. The dope is cast onto a highly polished metal drum 208 located within a first drying section 210 of the drying oven 212. The cast microfilm 214 is allowed to partially dry on the moving drum 208 and is then peeled from the drum 208. The cast microfilm 214 is then conveyed to a final drying section 216 to remove the remaining solvent. The final dried microfilm 218 is then wound into rolls at a wind-up station 220. The prior art cast microfilm typically has a thickness in the range of from 40 to 200 μm.

In general, thin microfilms of less than 40 μm are very difficult to produce by casting methods due to the fragility of wet microfilm during the peeling and drying processes. Cast microfilms may exhibit undesirable cockle or wrinkles. Thinner microfilms are especially vulnerable to dimensional artifacts either during the peeling and drying steps of the casting process or during subsequent handling of the microfilm. In addition, many cast microfilms may naturally become distorted over time due to the effects of moisture. For optical microfilms, good dimensional stability is necessary during storage as well as during subsequent assembly. Melt extruded microfilms have many of the same problems as cast microfilms. In addition only certain polymeric materials may be used to produce melt-extruded microfilms because the heat used to liquify the polymer may degrade the polymer.

There is a need, therefore, for an improved method of making resin microfilms for use as optical switch components.

SUMMARY OF THE INVENTION

The need is met according to one aspect of the present invention by providing a method of making a light diffusing microfilm, that includes providing a carrier substrate; coating a coating fluid onto the carrier substrate; drying the coating fluid on the carrier substrate to form a releasable light diffusing microfilm on the carrier substrate; and separating the light diffusing microfilm from the carrier substrate. According to another aspect of the invention, an optical film product includes a carrier substrate; and a light diffusing microfilm releasably formed on the carrier substrate.

According to another aspect of the invention, a method of making a microfilm having a textured surface, includes providing a carrier substrate; coating a subbing layer on the carrier substrate using a bubble forming coating fluid; drying the subbing layer to create microvoids in the subbing layer; coating a film forming coating fluid onto the subbing layer; drying the film forming coating fluid on the subbing layer to form a releasable microfilm having a textured surface defined by the microvoids on the subbing layer; and separating the microfilm from the subbing layer and the carrier substrate.

According to another aspect of the invention, a method of making a microfilm having a textured surface, includes providing a carrier substrate; coating a subbing layer on the carrier substrate using a phase separation coating fluid; drying the subbing layer to create a textured surface in the subbing layer; coating a film forming coating fluid onto the subbing layer; drying the film forming coating fluid on the subbing layer to form a releasable microfilm having a textured surface defined by the textured surface on the subbing layer; and separating the microfilm from the subbing layer and the carrier substrate.

According to another aspect of the invention, a microfilm product, includes a carrier substrate; a subbing layer having textured surface; and a microfilm releasably formed on the subbing layer having a textured surface defined by the textured surface of the subbing layer.

According to another aspect of the invention, a method of making a microfilm having a textured surface, includes providing a carrier substrate; coating a film forming coating fluid onto the subbing layer, the film forming coating liquid containing solid particles; drying the film forming coating fluid on the subbing layer to form a releasable microfilm having a textured surface defined by the solid particles; and separating the microfilm from the the carrier substrate.

DETAILED DESCRIPTION OF THE INVENTION

Figure 1:
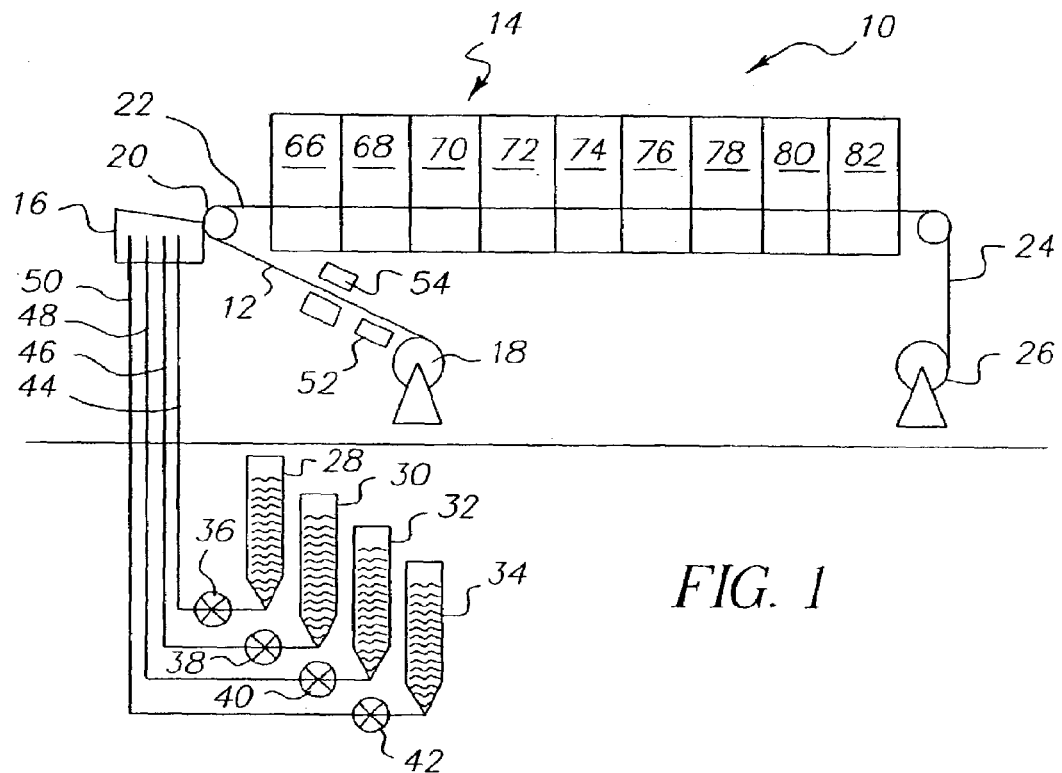
FIG. 1 is a schematic of an exemplary coating and drying apparatus that can be used in the practice of the method of the present invention.

A microfilm is produced according to the present invention by applying a low viscosity fluid containing polymeric resins onto a moving carrier substrate by a coating method. The resin solutions may also contain dispersed light scattering particles such as metal oxides. In a preferred embodiment, the light scattering particles are titanium dioxide with an average particle size of about 0.3 microns. The resin microfilm may be coated onto a carrier substrate that has a textured surface.

The texture of the surface of the carrier substrate may be controlled by applying a subbing layer to the carrier substrate. The texture of the subbing layer is controlled by deliberately creating microvoids in the subbing layer. These microvoids are formed by rapidly heating the wet subbing layer to induced bubble nucleation in the subbing layer. When dried and cooled, the bubbles collapse and form a uniform series of microvoids with a depth of 0–100 nm and a width of 50–2000 nm. The depth and diameter of the microvoids may be controlled by modifying drying temperatures, the use of co-solvents, surfactant concentrations, and the overall thickness of the subbing layer. For example, a microvoided subbing layer having a dry thickness of two microns is formed when fully hydrolyzed polyvinylalcohol containing 0.04% surfactant (for example, a polyoxyethylated octyl phenol available as Triton X-100™) is coated from solvent system of 92:8 water:ethanol where ratios are weight percent. Drying temperatures of 25 and 100 degrees Celsius are used in drying zones 66 and 68–82, respectively.

The microvoids are approximately 20 nm deep and 300 nm wide. A subbing layer prepared without ethanol or surfactant did not produce microvoids. Alternatively, a textured substrate may be created by coating a subbing layer containing particulates that protrude from the dried subbing layer. Alternatively, the textured surface may be created by applying a subbing fluid that contains incompatible resins. During the drying of the wet subbing layer, the incompatible polymers phase separate and create small microvoids and bumps on the surface of the subbing layer. For example, polymethylmethacryate and polystyrene in equal proportions may be dissolved in methylethyl ketone and coated onto a polyester support to form a layer that is two microns thick. When dried, the subbing layer is micro-textured with bumps and voids on the order of 50 nm deep and 1000 nm wide. Alternatively, unsubbed substrates may provide a very smooth surface with an average roughness of less than 1 nm.

In some cases, the optical switch microfilm may be difficult to peel from the textured subbing layer. In these cases, a textured optical switch microfilm may be formed by peeling together the subbing layer and the optical switch microfilm. After peeling, the subbing layer may be washed away from the optical switch microfilm. For example, an optical switch microfilm of cellulose acetate may be formed on top of a textured polyvinylalcohol subbing layer applied to a PET support. Subsequently, the cellulose acetate microfilm and polyvinylalcohol subbing layer are peeled away from the PET substrate and soaked in water to wash away the polyvinylalcohol subbing layer. Because cellulose acetate does not dissolve in water, only the resulting optical switch microfilm remains behind with a mirror image of the textured subbing surface.

The above discussion relates a method to control the texture of an optical switch microfilm on the surface of the microfilm that is contacting the carrier substrate or the subbing layer of the carrier substrate. To control the texture on the opposite side or the air-exposed side of the microfilm, an optical switch microfilm is prepared using a multi-layer composite structure. Normally, a single layer microfilm containing dispersed titanium dioxide forms a bumpy optical switch microfilm. Bumps are typically 200 nm in height. To prepare a microfilm with smaller protrusions or bumps, a multi-layer composite with the uppermost layer having no titanium dioxide may be applied to a carrier substrate simultaneously.

In this case, the uppermost layer contains only solvent and resin. By varying the wet thickness of the uppermost layer the texture of the surface of the dried microfilm may be controlled. Alternatively, the texture may be controlled by coating the optical switch microfilm and carrier substrate composite with a second coating that contains only solvent and resin to produce a smoother final microfilm. The smoothness of the microfilm may be controlled by attenuating the thickness of the second coated layer.

The optical switch microfilm is not separated from the carrier substrate until the coated microfilm is substantially dry (<10% residual solvent by weight). In fact, the composite structure of resin microfilm and carrier substrate may be wound into rolls and stored until needed. Thus, the carrier substrate cradles the optical switch microfilm and protects against shearing forces during conveyance through the drying process. Moreover, because the resin microfilm is dry and solid when it is finally peeled from the carrier substrate, there is no shear or orientation of polymer within the microfilm due to the peeling process. As a result, microfilms prepared by the current invention are remarkably amorphous and exhibit very low in-plane birefringence.

Polymeric microfilms can be made with the method of the present invention having a thickness of about 1 to 500 µm. Very thin resin microfilms of less than 40 microns can be easily manufactured at line speeds not possible with prior art methods. The fabrication of very thin microfilms is facilitated by a carrier substrate that supports the wet microfilm through the drying process and eliminates the need to peel the microfilm from a metal band or drum prior to a final drying step as required in the casting methods described in prior art. Rather, the microfilm is substantially, if not completely, dried before separation from the carrier substrate.

In all cases, dried resin microfilms have a residual solvent content of less than 10% by weight. In a preferred embodiment of the present invention, the residual solvent content is less than 5%, and most preferably less than 1%. Thus, the present invention readily allows for preparation of very delicate thin microfilms not possible with the prior art casting method. In addition, thick microfilms of greater than 40 µm may also be prepared by the method of the present invention. To fabricate thicker microfilms, additional coatings may be applied over a microfilm-substrate composite either in a tandem operation or in an offline process without comprising optical quality. In this way, the method of the present invention overcomes the limitation of solvent removal during the preparation of thicker microfilms since the first applied microfilm is dry before application of a subsequent wet microfilm. Thus, the present invention allows for a broader range of final microfilm thickness than is possible with casting methods.

Resin microfilms are created by forming a single layer or a multi-layer composite on a slide surface of a coating hopper, the multi-layer composite including a bottom layer of low viscosity, one or more intermediate layers, and an optional top layer containing a surfactant, flowing the multi-layer composite down the slide surface and over a coating lip of the coating hopper, and applying the multi-layer composite to a moving substrate. In particular, the use of multi-layer coating allows for application of several liquid layers having unique composition.

Coating aids and additives may be placed in specific layers to improve microfilm performance or improve manufacturing robustness. For example, multi-layer application allows a surfactant to be placed in the top spreading layer where needed rather than through out the entire wet microfilm. In another example, the concentration of polymer in the lowermost layer may be adjusted to achieve low viscosity and facilitate high-speed application of the multi-layer composite onto the carrier substrate. Therefore, the present invention provides an advantageous method for the fabrication of multiple layer composite microfilms such as required for certain optical elements or other similar elements. Wrinkling and cockle artifacts are minimized with the method of the present invention through the use of the carrier substrate. By providing a stiff backing for the resin microfilm, the carrier substrate minimizes dimensional distortion of the optical microfilm. This is particularly advantageous for handling and processing very thin microfilms of less than about 40 microns.

Moreover, scratches and abrasion artifacts that are known to be created by the casting method are avoided with the method of the present invention since the carrier substrate lies between the resin microfilm and potentially abrasive conveyance rollers during all drying operations. Thus, the method of the present invention does not require the use of co-solvents, lubricants or protective laminates as converting aids as are needed in casting operations to minimize abrasion artifacts. In addition, the restraining nature of the carrier substrate also eliminates the tendency of resin microfilms to distort or cockle over time as a result of changes in moisture levels. Thus, the method of the current invention insures that polymeric optical microfilms are dimensionally stable during preparation and storage as well as during final handling steps necessary for fabrication of optical elements.

In the practice of the method of the present invention, it is preferred that the carrier substrate be a web such as polyethylene terephthalate (PET). The PET carrier substrate may be pretreated with a roughened subbing layer that acts as a physical template for the coated optical switch microfilm. The texture of the roughened subbing may be achieved by nucleation of small bubbles in the subbing layer. For example, an electrical discharge device may be employed to modify adhesion between the resin microfilm and the PET substrate. In particular, a subbing layer or electrical discharge treatment may enhance the adhesion between the microfilm and the substrate, but still allow the microfilm to be subsequently peeled away from the substrate.

Although the present invention is discussed herein with particular reference to a slide bead coating operation, those skilled in the art will understand that the present invention can be advantageously practiced with other coating operations. For example, freestanding microfilms having low in-plane retardation should be achievable with single or multiple layer slot die coating operations and single or multiple layer curtain coating operations. Moreover, those skilled in the art will recognize that the present invention can be advantageously practiced with alternative carrier substrates. For example, peeling microfilms having low in-plane birefringence should be achievable with other resin supports [e.g. polyethylene naphthalate (PEN), cellulose acetate, PET], paper supports, resin laminated paper supports, and metal supports (e.g. aluminum).

Practical applications of the present invention include the preparation of polymeric microfilms used as optical microfilms. In particular, resin microfilms prepared by the method of the present invention may be utilized as optical elements in the manufacture of electronic displays utilizing otpical switch microfilms. Examplary optical resins include those described here, i.e. cellulose triaceate, polyvinyl alcohol, polycarbonate, polyethersulfone, polymethylmethacrylate, and polyvinylbutyral. Other potential optical resins might include fluoropolymers (polyvinylidene fluoride, polyvinyl fluoride, and polycholorotrifluorethene), other cellulosics (cellulose diacetate, cellulose acetate butyrate, cellulose acetate propionate, ethylcellulose), polyoefins (cyclic olefin polymers), polystyrene, aromatic polyesters (polyarylates and polyethylene terephthalate), sulfones (polysulfones, polyethersulfones, polyarylsulfone), and polycarbonate copolymers, among others.

Turning now to FIG. 1 there is shown a schematic of an exemplary and well-known coating and drying system 10 suitable for practicing the method of the present invention. The coating and drying system 10 is typically used to apply very thin microfilms to a moving substrate 12 and to subsequently remove solvent in a dryer 14. A single coating apparatus 16 is shown such that system 10 has only one coating application point and only one dryer 14, but two or three (even as many as six) additional coating application points with corresponding drying sections are known in the fabrication of composite thin microfilms. The process of sequential application and drying is known in the art as a tandem coating operation.

Coating and drying apparatus 10 includes an unwinding station 18 to feed the moving substrate 12 around a back-up roller 20 where the coating is applied by coating apparatus 16. The coated web 22 then proceeds through the dryer 14. In the practice of the method of the present invention the final dry microfilm 24 comprising a resin microfilm on substrate 12 is wound into rolls at a wind-up station 26.

As depicted, an exemplary four-layer coating is applied to moving web 12. Coating liquid for each layer is held in respective coating supply vessel 28, 30, 32, 34. The coating liquid is delivered by pumps 36, 38, 40, 42 from the coating supply vessels to the coating apparatus 16 conduits 44, 46, 48, 50, respectively. In addition, coating and drying system 10 may also include electrical discharge devices, such as corona or glow discharge device 52, or polar charge assist device 54, to modify the substrate 12 prior to application of the coating.

Figure 8:
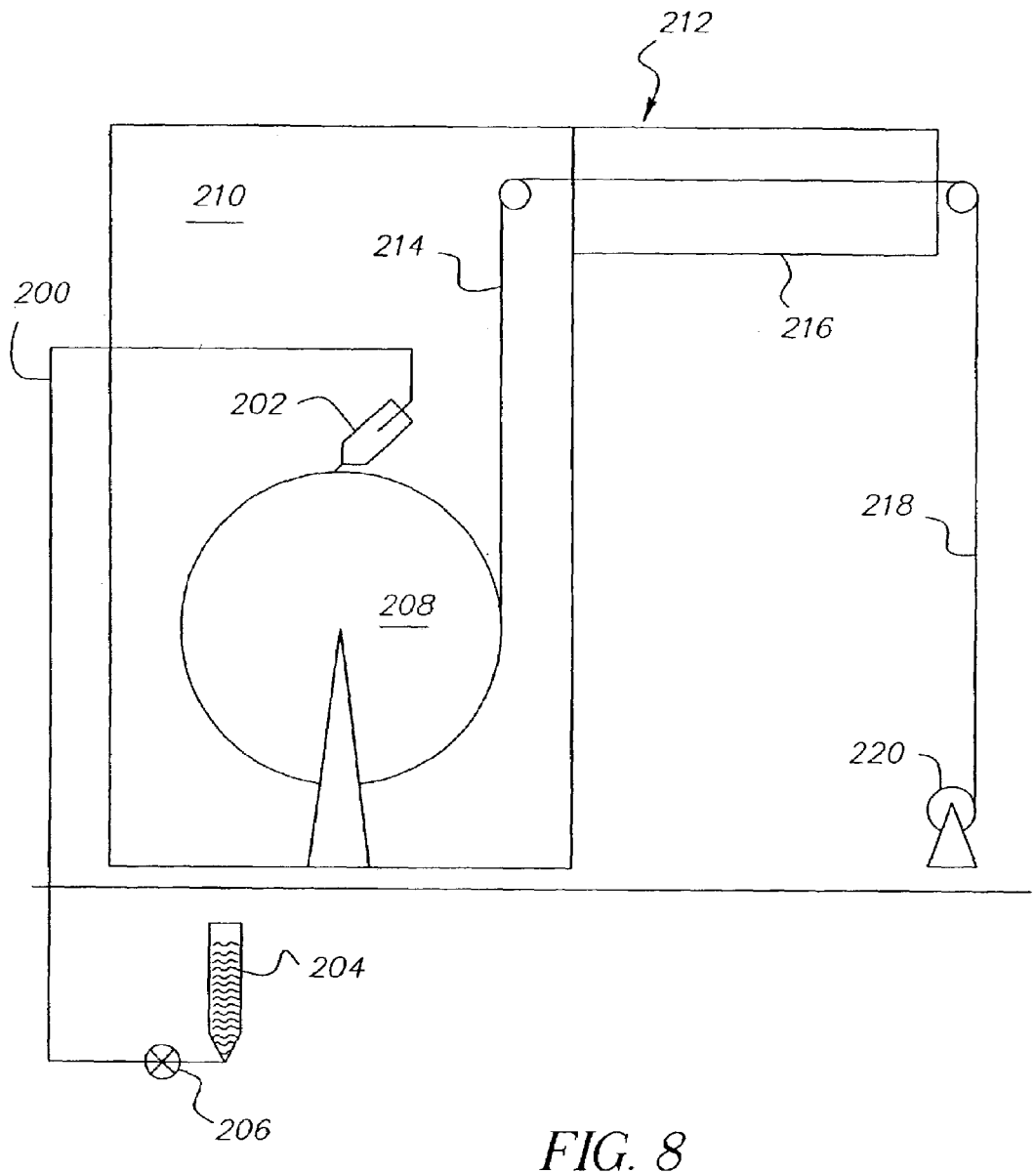
FIG. 8 is a schematic of a casting apparatus as used in prior art to cast resin microfilms.

Coating methods are distinguished from casting methods by the process steps necessary for each technology. These process steps in turn affect a number of tangibles such as fluid viscosity, converting aids, substrates, and hardware that are unique to each method. In general, coating methods involve application of dilute low viscosity liquids to thin flexible substrates, evaporating the solvent in a drying oven, and winding the dried microfilm/substrate composite into rolls. In contrast, casting methods involve applying a concentrated viscous dope to a highly polished metal drum or band, partially drying the wet microfilm on the metal substrate, stripping the partially dried microfilm from the substrate, removing additional solvent from the partially dried microfilm in a drying oven, and winding the dried microfilm into rolls. In terms of viscosity, coating methods require very low viscosity liquids of less than 5,000 cp. In the practice of the method of the present invention the viscosity of the coated liquids will generally be less than 2000 cp and most often less than 1500 cp. Moreover, in the method of the present invention the viscosity of the lowermost layer is preferred to be less than 200 cp. and most preferably less than 100 cp. for high speed coating application. In contrast, casting methods require highly concentrated dopes with viscosity on the order of 10,000–100,000 cp for practical operating speeds. In terms of converting aids, coating methods generally involve the use of surfactants as converting aids to control flow after coating artifacts such as mottle, repellencies, orange peel, and edge withdraw. In contrast, casting methods do not require surfactants. Instead, converting aids are only used to assist in the stripping and conveyance operations in casting methods. For example, lower alcohols are sometimes used as converting aids in cast optical microfilms to minimize abrasion artifacts during conveyance through drying ovens. In terms of substrates, coating methods generally utilize thin (10–250 micron) flexible supports. In contrast, casting methods employ thick (1–100 mm), continuous, highly polished metal drums or rigid bands. As a result of these differences in process steps, the hardware used in coating is conspicuously different from those used in casting as can be seen by a comparison of the schematics shown in FIGS. 1 and 8, respectively.

Figure 2:
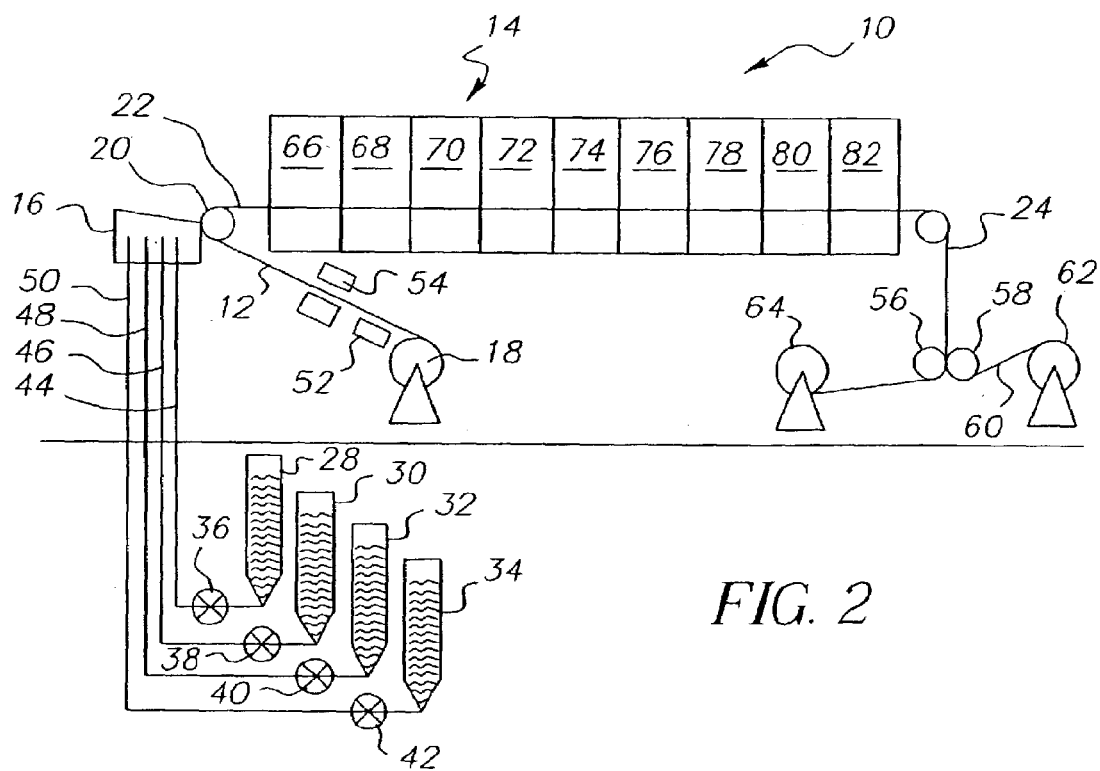
FIG. 2 is a schematic of an exemplary coating and drying apparatus of FIG. 1 including a station where the light diffusing microfilm separated from the substrate is separately wound.

Turning next to FIG. 2 there is shown a schematic of the same exemplary coating and drying system 10 depicted in FIG. 1 with an alternative winding operation. Accordingly, the drawings are numbered identically up to the winding operation. In the practice of the method of the present invention, the dry microfilm 24 comprising a substrate (which may be a resin microfilm, paper, resin coated paper or metal) with a resin coating applied thereto is taken between opposing rollers 56, 58. The resin microfilm 60 is peeled from substrate 12 with the optical microfilm going to winding station 62 and the substrate 12 going to winding station 64. In a preferred embodiment of the present invention, polyethylene terephthalate (PET) is used as the substrate 12. The substrate 12 may be pretreated with a subbing layer to enhance adhesion of the coated microfilm 60 to the substrate 12.

The coating apparatus 16 used to deliver coating fluids to the moving substrate 12 may be a multi-layer applicator such as a slide bead hopper, as taught for example in U.S. Pat. No. 2,761,791 to Russell, or a slide curtain hopper, as taught by U.S. Pat. No. 3,508,947 to Hughes. Alternatively, the coating apparatus 16 may be a single layer applicator, such as a slot die hopper or a jet hopper. In a preferred embodiment of the present invention, the application device 16 is a multi-layer slide bead hopper.

As mentioned above, coating and drying system 10 includes a dryer 14 that will typically be a drying oven to remove solvent from the coated microfilm. An exemplary dryer 14 used in the practice of the method of the present invention includes a first drying section 66 followed by eight additional drying sections 68–82 capable of independent control of temperature and air flow. Although dryer 14 is shown as having nine independent drying sections, drying ovens with fewer compartments are well known and may be used to practice the method of the present invention. In a preferred embodiment of the present invention the dryer 14 has at least two independent drying zones or sections.

Preferably, each of drying sections 68–82 have independent temperature and airflow controls. In each section, temperature may be adjusted between 5° C. and 150° C. To minimize drying defects from case hardening or skinning-over of the wet microfilm, optimum drying rates are needed in the early sections of dryer 14. There are a number of artifacts created when temperatures in the early drying zones are inappropriate. For example, fogging or blush of polycarbonate microfilms is observed when the temperature in zones 66, 68 and 70 are set at 25° C. This blush defect is particularly problematic when high vapor pressures solvents (methylene chloride and acetone) are used in the coating fluids. Aggressively high temperatures are also associated with other artifacts such as case hardening, reticulation patterns and microvoids in the resin microfilm. In one embodiment of the present invention, the first drying section 66 is operated at a temperature of at least about 25° C. but less than 95° C. with no direct air impingement on the wet coating of the coated web 22. In another embodiment of the method of the present invention, drying sections 68 and 70 are also operated at a temperature of at least about 25° C. but less than 95° C. The actual drying temperature in drying sections 66, 68 may be optimized empirically within this range by those skilled in the art.

Figure 3:
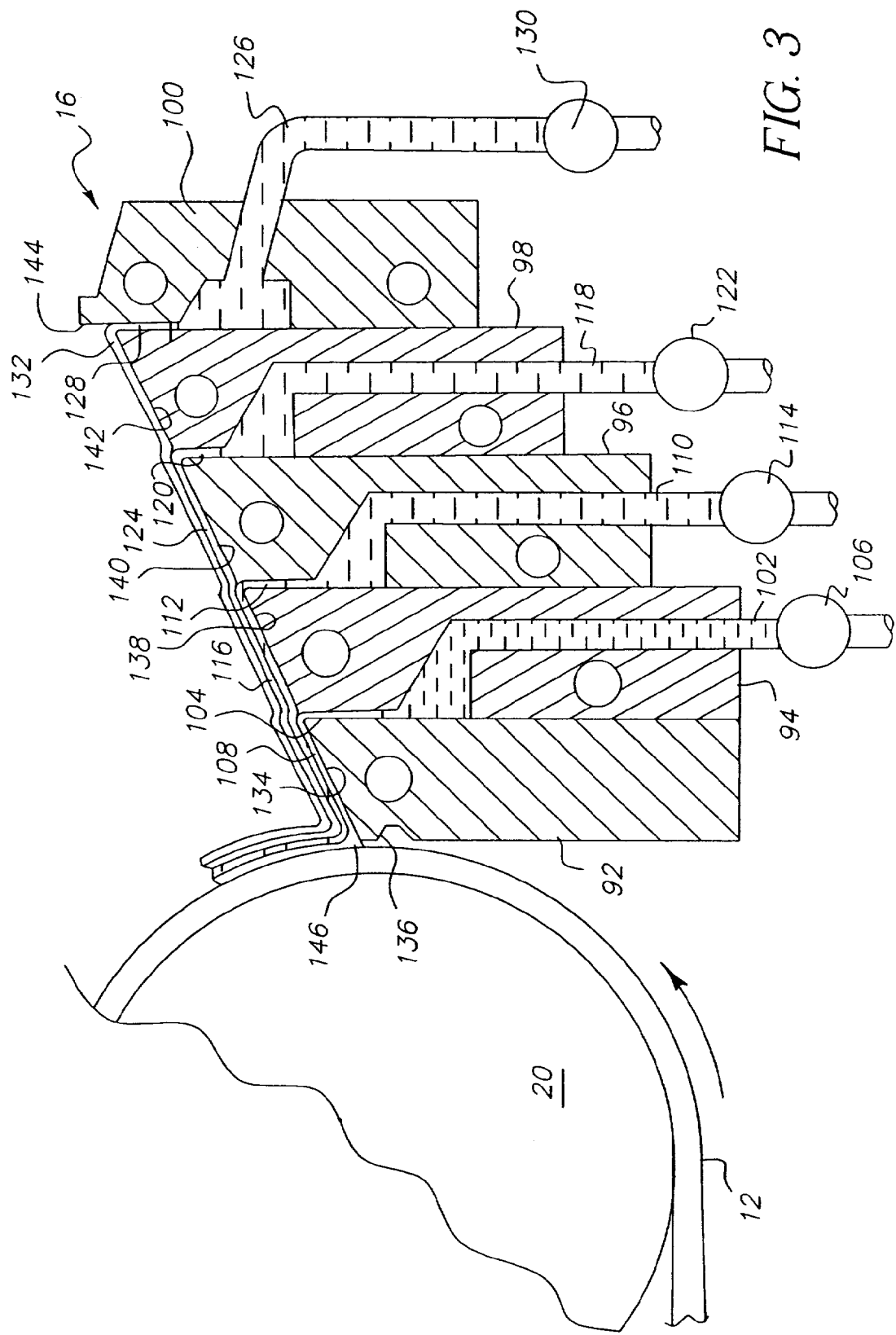
FIG. 3 is a schematic of an exemplary multi-slot coating apparatus that can be used in the practice of the method of the present invention.

Referring now to FIG. 3, a schematic of an exemplary coating apparatus 16 is shown in detail. Coating apparatus 16, schematically shown in side elevational cross-section, includes a front section 92, a second section 94, a third section 96, a fourth section 98, and a back plate 100. There is an inlet 102 into second section 94 for supplying coating liquid to first metering slot 104 via pump 106 to thereby form a lowermost layer 108. There is an inlet 110 into third section 96 for supplying coating liquid to second metering slot 112 via pump 114 to form layer 116. There is an inlet 118 into fourth section 98 for supplying coating liquid to metering slot 120 via pump 122 to form layer 124. There is an inlet 126 into back plate 100 for supplying coating liquid to metering slot 128 via pump 130 to form layer 132.

Each slot 104, 112, 120, 128 includes a transverse distribution cavity. Front section 92 includes an inclined slide surface 134, and a coating lip 136. There is a second inclined slide surface 138 at the top of second section 94. There is a third inclined slide surface 140 at the top of third section 96. There is a fourth inclined slide surface 142 at the top of fourth section 98. Back plate 100 extends above inclined slide surface 142 to form a back land surface 144. Residing adjacent the coating apparatus or hopper 16 is a coating backing roller 20 about which a web 12 is conveyed. Coating layers 108, 116, 124, 132 form a multi-layer composite which forms a coating bead 146 between lip 136 and substrate 12. Typically, the coating hopper 16 is movable from a non-coating position toward the coating backing roller 20 and into a coating position. Although coating apparatus 16 is shown as having four metering slots, coating dies having a larger number of metering slots (as many as nine or more) are well known and may be used to practice the method of the present invention.

Coating fluids are comprised principally of polymeric resins dissolved in a suitable solvent. Light scattering particulates may also be dispersed in the coating fluids. Suitable resins include any polymeric material that may be used to form a transparent microfilm. Practical examples of resins currently used to form optical microfilms include polyvinyl alcohols, polyvinylbutyrals, acrylics, and polystyrene, cellulosics, polycarbonates, and polyarylates, polyolefins, fluoroplastics (e.g. polyvinylfluoride and polyvinylidene fluoride), sulfones. In the method of the present invention, there are no particular limitations as to the type of polymers or blends of polymers that may be used to form optical switch microfilms.

In terms of solvents for aforementioned resin materials, suitable solvents include, for example, chlorinated solvents (methylene chloride and 1,2 dichloroethane), alcohols (methanol, ethanol, n-propanol, isopropanol, n-butanol, isobutanol, diacetone alcohol, phenol, and cyclohexanol), ketones (acetone, methylethyl ketone, methylisobutyl ketone, and cyclohexanone), esters (methyl acetate, ethyl acetate, n-propyl acetate, isopropyl acetate, isobutyl acetate, and nbutyl acetate), aromatics (toluene and xylenes) and ethers (tetrahydrofuran, 1,3-dioxolane, 1,2-dioxolane, 1,3-dioxane, 1,4-dioxane, and 1,5-dioxane). Water may also be used as a solvent. Coating solutions may also be prepared with a blend of the aforementioned solvents.

Coating fluids may also contain additives to act as converting aids. Converting aids include plasticizers and surfactants, and these additives are generally specific to the type of polymer microfilm. For example, plasticizers suitable for polycarbonate, polyethersulfone, and cellulose triacetate microfilms include phthalate esters (diethylphthalate, dibutylphthalate, dicyclohexylphthalate, dioctylphthalate, and butyl octylphthalate), adipate esters (dioctyl adipate), and phosphate esters (tricresyl phosphate and triphenyl phosphate). For the water-soluble polyvinyl alcohols, on the other hand, suitable plasticizers include polyhydric alcohols such as glycerin and ethylene glycol as well as amine alcohols such as ethanolamine.

Plasticizers may be used here as coating aids in the converting operation to minimize premature microfilm solidification at the coating hopper and to improve drying characteristics of the wet microfilm. In the method of the present invention, plasticizers may be used to minimize blistering, curl and delamination of resin microfilms during the drying operation. In a preferred embodiment of the present invention, plasticizers may be added to the coating fluid at a total concentration of up to 50% by weight relative to the concentration of polymer in order to mitigate defects in the final resin microfilm.

Coating fluids may also contain surfactants as coating aids to control artifacts related to flow after coating. Artifacts created by flow after coating phenomena include mottle, repellencies, orange-peel (Bernard cells), and edge-withdraw. For polymeric resins dissolved in organic solvents, surfactants used control flow after coating artifacts include siloxane and fluorochemical compounds. Examples of commercially available surfactants of the siloxane type include: 1.) Polydimethylsiloxanes such as DC200 Fluid from Dow Corning, 2.) Poly(dimethyl, methylphenyl)siloxanes such as DC510 Fluid from Dow Corning, and 3.) Polyalkyl substituted polydimethysiloxanes such as DC190 and DC1248 from Dow Corning as well as the L7000 Silwet series (L7000, L7001, L7004 and L7230) from Union Carbide, and 4.) Polyalkyl substituted poly(dimethyl, methylphenyl)siloxanes such as SF1023 from General Electric. Examples of commercially available fluorochemical surfactants include: 1.) Fluorinated alkyl esters such as the Fluorad series (FC430 and FC431) from the 3M Corporation, 2.) Fluorinated polyoxyethylene ethers such as the Zonyl series (FSN, FSN100, FSO, FS0100) from Du Pont, 3.) Acrylate polyperfluoroalkyl ethylacrylates such as the F series (F270 and F600) from NOF Corporation, and 4.) Perfluoroalkyl derivatives such as the Surflon series (S383, S393, and S8405) from the Asahi Glass Company.

For polymeric resins dissolved in aqueous solvents, appropriate surfactants include those suitable for aqueous coating as described in numerous publications (see for example Surfactants: Static and dynamic surface tension by YM Tricot in *Liquid Film Coating*, pp 99–136, S E Kistler and P M Schweitzer editors, Chapman and Hall [1997]). Surfactants may include nonionic, anionic, cationic and amphoteric types. Examples of practical surfactants include polyoxyethylene ethers, such as polyoxyethylene (8) isooctylphenyl ether, polyoxyethylene (10) isooctylphenyl ether, and polyoxyethylene (40) isooctylphenyl ether, and fluorinated polyoxyethylene ethers such as the Zonyl series commercially available from Du Pont.

There are no particular limits as to the type of surfactant used. Useful surfactants are generally of the non-ionic type. In a preferred embodiment of the present invention, non-ionic compounds of either the siloxane or fluorinated type are added to the uppermost layers when microfilms are prepared with organic solvents. In terms of surfactant distribution, surfactants are most effective when present in the uppermost layers of the multi-layer coating. In the uppermost layer, the concentration of surfactant is preferably 0.001–1.000% by weight and most preferably 0.010–0.500%. In addition, lesser amounts of surfactant may be used in the second uppermost layer to minimize diffusion of surfactant away from the uppermost layer. The concentration of surfactant in the second uppermost layer is preferably 0.000–0.200% by weight and most preferably between 0.000–0.100% by weight. Because surfactants are only necessary in the uppermost layers, the overall amount of surfactant remaining in the final dried microfilm is small.

Figure 4:
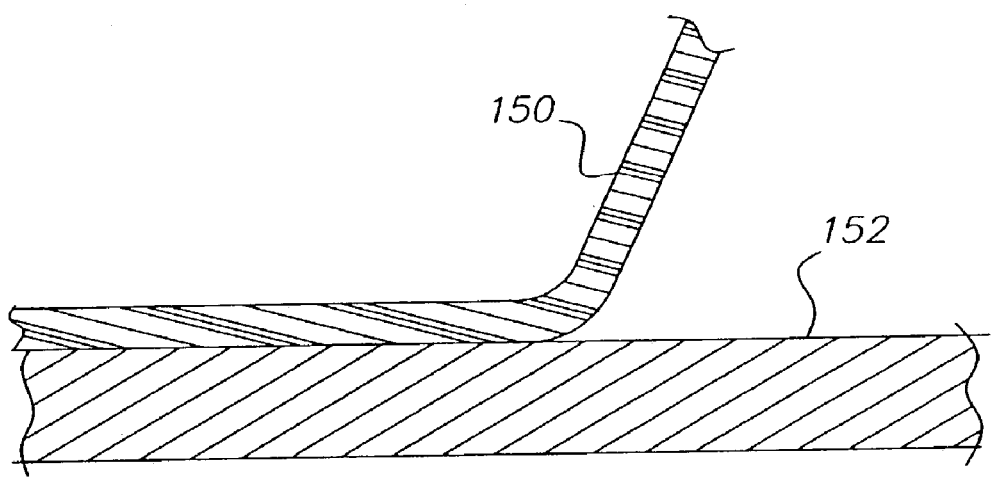
FIG. 4 shows a cross-sectional representation of a single-layer light diffusing microfilm partially peeled from a carrier substrate and formed by the method of the present invention.
Figure 5:
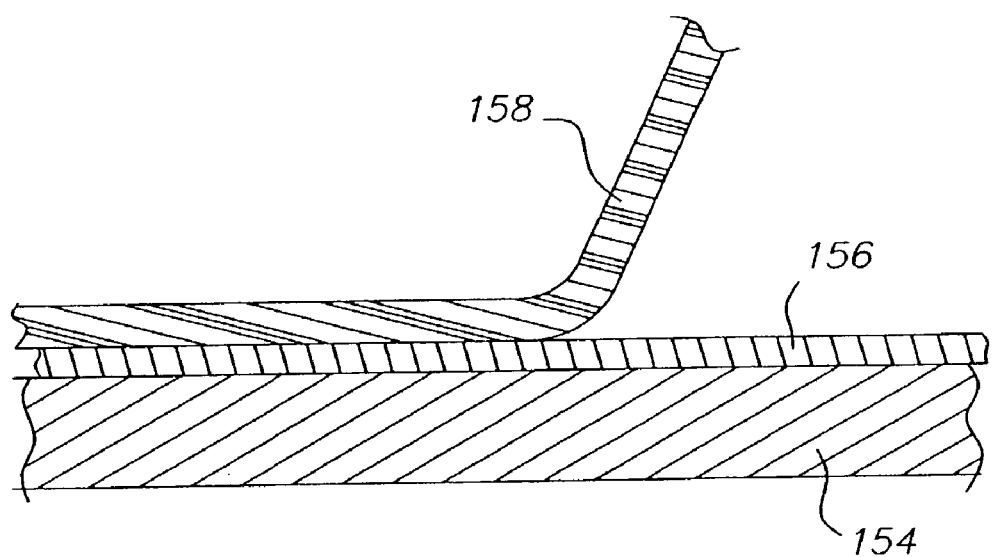
FIG. 5 shows a cross-sectional representation of a single-layer light diffusing microfilm partially peeled from a carrier substrate and formed by the method of the present invention wherein the carrier substrate has a subbing layer formed thereon.
Figure 6:
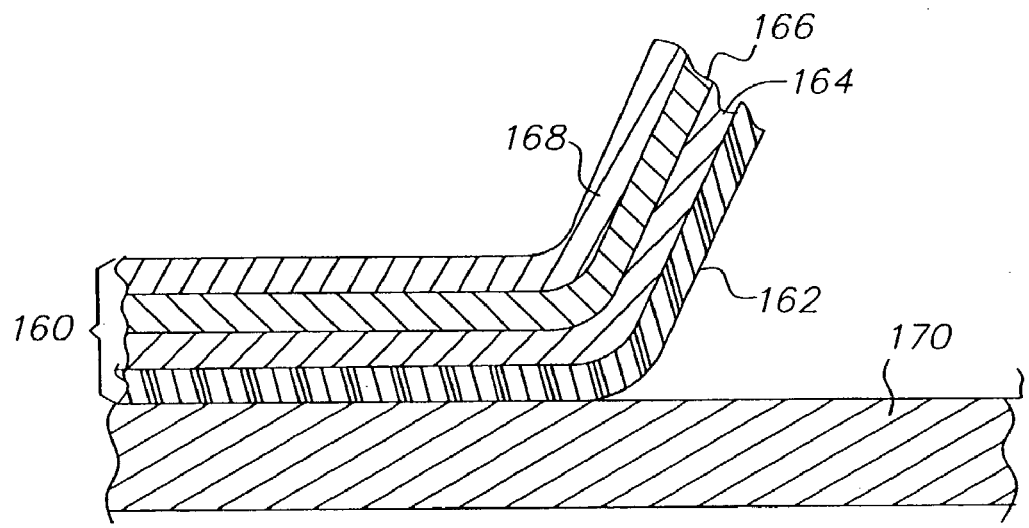
FIG. 6 shows a cross-sectional representation of a multi-layer light diffusing microfilm partially peeled from a carrier substrate and formed by the method of the present invention.

Turning next to FIGS. 4 through 7, there are presented cross-sectional illustrations showing various film configurations prepared by the method of the present invention. In FIG. 4, a single-layer optical switch microfilm 150 is shown partially peeled from a carrier substrate 152. Optical microfilm 150 may be formed either by applying a single liquid layer to the carrier substrate 152 or by applying a multiple layer composite having a composition that is substantially the same among the layers. Alternatively in FIG. 5, the carrier substrate 154 may have been pretreated with a subbing layer 156 that modifies the adhesive force between the single layer optical microfilm 158 and the substrate 154. FIG. 6 illustrates a multiple layer microfilm 160 that is comprised of four compositionally discrete layers including a lowermost layer 162 nearest to the carrier support 170, two intermediate layers 164, 166, and an uppermost layer 168.

Figure 7:
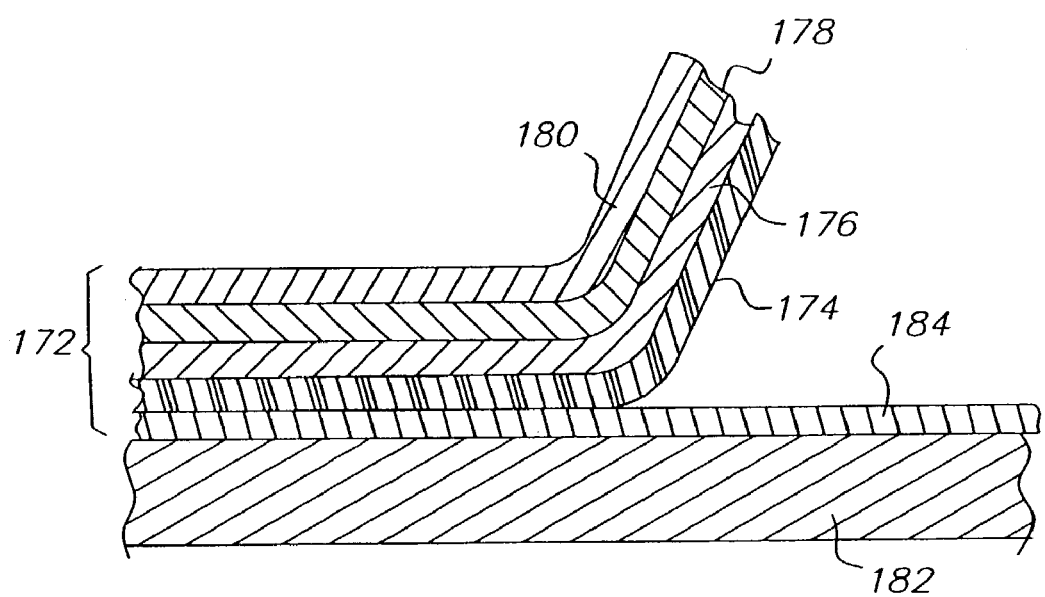
FIG. 7 shows a cross-sectional representation of a multi-layer light diffusing microfilm partially peeled from a carrier substrate and formed by the method of the present invention wherein the carrier substrate has a subbing layer formed thereon.

FIG. 6 also shows that the entire multiple layer composite 160 may be peeled from the carrier substrate 170. FIG. 7 shows a multiple layer composite microfilm 172 comprising a lowermost layer 174 nearest to the carrier substrate 182, two intermediate layers 176, 178, and an uppermost layer 180 being peeled from the carrier substrate 182. The carrier substrate 182 has been treated with a subbing layer 184 to modify the adhesion between the composite microfilm 172 and substrate 182.

Subbing layers 156 and 184 may be comprised of a number of polymeric materials such as polyvinyacetals, polycarbonates, polyurethanes, cellulosics, acrylics, gelatin and poly(acrylonitrile-co-vinylidene chloride-co-acrylic acid). The choice of materials used in the subbing layer may be optimized empirically by those skilled in the art.

The method of the present invention may also include the step of coating over a previously prepared composite of resin microfilm and carrier substrate. For example, the coating and drying system 10 shown in FIGS. 1 and 2 may be used to apply a second multi-layer microfilm to an existing optical microfilm/substrate composite. If the film/substrate composite is wound into rolls before applying the subsequent coating, the process is called a multi-pass coating operation. If coating and drying operations are carried out sequentially on a machine with multiple coating stations and drying ovens, then the process is called a tandem coating operation. In this way, thick microfilms may be prepared at high line speeds without the problems associated with the removal of large amounts of solvent from a very thick wet microfilm. Moreover, the practice of multi-pass or tandem coating also has the advantage of minimizing other artifacts such as streak severity, mottle severity, and overall microfilm nonuniformity.

The practice of tandem coating or multi-pass coating requires some minimal level of adhesion between the first-pass film and the carrier substrate. In some cases, film/substrate composites having poor adhesion are observed to blister after application of a second or third wet coating in a multi-pass operation. To avoid blister defects, adhesion must be greater than 0.3 N/m between the first-pass resin microfilm and the carrier substrate. This level of adhesion may be attained by a variety of web treatments including various subbing layers and various electronic discharge treatments. However, excessive adhesion between the applied microfilm and substrate is undesirable since the microfilm may be damaged during subsequent peeling operations. In particular, microfilm/substrate composites having an adhesive force of greater than 250 N/m have been found to peel poorly. Microfilms peeled from such excessively, well-adhered composites exhibit defects due to tearing of the microfilm and/or due to cohesive failure within the microfilm. In a preferred embodiment of the present invention, the adhesion between the resin microfilm and the carrier substrate is less than 250 N/m. Most preferably, the adhesion between resin microfilm and the carrier substrate is between 0.5 and 25 N/m.

The method of the present invention is suitable for application of resin coatings to a variety of substrates such as polyethylene terephthalate (PET), polyethylene naphthalate (PEN), polystyrene, cellulose triaceate and other polymeric microfilms. Polymeric substrates may be unstretched, unixially stretched or biaxially stretched microfilms or sheets. Additional substrates may include paper, laminates of paper and polymeric microfilms, glass, cloth, aluminum and other metal supports. In some cases, substrates may be pretreated with subbing layers or electrical discharge devices. Substrates may also be pretreated with functional layers containing various binders and addenda. There are no particular requirements regarding the thickness of the substrate. For the optical resin microfilms prepared here, the substrate is PET with a thickness of either 100 or 175 μm. The method of the present invention may be practiced using substrates having a thickness of 5 to 500 μm.

The following tests were used to determine the microfilm properties.

Thickness. Thickness of the final peeled microfilm was measured in microns using a Model EG-225 gauge from the Ono Sokki Company.

Retardation. In-plane retardation ($R_e$) of peeled microfilms were determined in nanometers (nm) using a Woollam M-2000V Spectroscopic Ellipsometer at wavelengths from 370 to 1000 nm. In-plane retardation values in Table I are computed for measurements taken at 590 nm. In-plane retardation is defined by the formula:

$$R_e = |n_x - n_y| \times d$$

where $R_e$ is the in-plane retardation at 590 nm, $n_x$ is the index of refraction of the peeled microfilm in the slow axis direction, $n_y$ is the is the index of refraction of the peeled microfilm in the fast axis direction, and d is the thickness of the peeled microfilm in nanometers (nm). Thus, $R_e$ is the absolute value of the difference in birefringence between the slow axis direction and the fast axis direction in the plane of the peeled microfilm multiplied by the thickness of the microfilm.

Transmittance and Haze. Total transmittance (Trans) and haze are measured using the Haze-Gard Plus (Model HB-4725) from BYK-Gardner. Total transmittance is all the light energy transmitted through the microfilm as absorbed on an integrating sphere. Transmitted haze is all light energy scattered beyond 2.5° as absorbed on an integrating sphere.

Surface Roughness. Average surface roughness (Ra) was determined in nanometers (nm) by scanning probe microscopy using TappingMode™ Atomic Force Microscopy, Model D300 from Digital Instruments.

Adhesion. The adhesive strength of the coated samples was measured in Newtons per meter (N/m) using a modified 180° peel test with an Instron 1122 Tensile Tester with a 500 gram load cell. First, 0.0254 m (one inch) wide strips of the coated sample were prepared. Delamination of the coating at one end was initiated using a piece of 3M Magic Tape. An additional piece of tape was then attached to the delaminated part of the coating and served as the gripping point for testing. The extending tape was long enough to extend beyond the support such that the Instron grips did not interfere with the testing. The sample was then mounted into the Instron 1122 Tensile Tester with the substrate clamped tin the upper grip and the coating/tape assembly clamped in the bottom grip. The average force (in units of Newtons) required to peel the coating off the substrate at a 180° angle at speed of 2 inches/min (50.8 mm/min) was recorded. Using this force value the adhesive strength in units of N/m was calculated using the equation:

$$S_A = F_p(1 - \cos\theta)/w$$

wherein $S_A$ is the adhesive strength, $F_p$ is the peel force, $\theta$ is the angle of peel (180°), and w is the width of the sample (0.0254 m).

Residual Solvent. A qualitative assessment of residual solvents remaining in a dried microfilm is done by first peeling the microfilm from the carrier substrate, weighing the peeled microfilm, incubating the microfilm in an oven at 150° C. for 16 hours, and finally weighing the incubated microfilm. Residual solvent is expressed as percentage of the weight difference divided by the post-incubation weight.

From the foregoing, it will be seen that this invention is one well adapted to obtain all of the ends and objects herein above set forth together with other advantages which are apparent and which are inherent to the apparatus.

It will be understood that certain features and sub-combinations are of utility and may be employed with reference to other features and sub-combinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

PARTS LIST 10 drying system
12 moving substrate/web
14 dryer
16 coating apparatus
18 unwinding station
20 back-up roller
22 coated web
24 dry microfilm
26 wind up station
28 coating supply vessel
30 coating supply vessel
32 coating supply vessel
34 coating supply vessel
36 pumps
38 pumps
40 pumps
42 pumps
44 conduits
46 conduits
48 conduits
49 conduits
50 discharge device
52 polar charge assist device
54 opposing rollers
56 opposing rollers
58 resin microfilm
60 winding station
66 drying section
68 drying section
70 drying section
72 drying section
74 drying section
76 drying section
78 drying section 80 drying section
82 drying section
92 front section
94 second section
96 third section
98 fourth section
100 back plate
102 inlet
104 metering slot
106 pump
108 lower most layer
110 inlet
112 2$^{nd}$ metering slot
114 pump
116 layer
118 inlet
120 metering slot
122 pump
124 form layer
126 inlet
128 metering slot
130 pump
132 layer
134 incline slide surface
136 coating lip
138 2$^{nd}$ incline slide surface
140 3$^{rd}$ incline slide surface
142 4$^{th}$ incline slide surface
144 back land surface
146 coating bead
150 optical switch microfilm
152 carrier substrate
154 carrier substrate
156 subbing layer
158 optical microfilm
160 multiple layer microfilm
162 lowermost layer
164 intermediate layers
166 intermediate layers
168 uppermost layer
170 carrier support
172 composite microfilm
174 lower most layer
176 intermediate layers
178 intermediate layers
180 upper most layers
182 carrier substrate
184 subbing layer
200 feed line
202 extrusion hopper
204 pressurized tank
206 pump
208 metal drum
210 drying section
212 drying oven
214 cast microfilm
216 final drying section
218 final dried microfilm
220 wind-up station

What is claimed is:

1. A method of making a light diffusing microfilm, consisting essentially of:
   providing a carrier substrate;
   coating a coating fluid onto the carrier substrate;
   drying the coating fluid on the carrier substrate to form a releasable light diffusing microfilm on the carrier substrate, winding the composite of carrier and light diffusing microfilm into a roll, storing the roll of light diffusing microfilm on the carrier substrate and separating it from the carrier substrate prior to use wherein the step of coating is a simultaneous multi-layer coating process including a light scattering layer and wherein the light scattering layer includes light scattering particles and the multi-layer coating process includes a layer over the light scattering layer to control the texture of the surface of the light diffusing microfilm.

2. The method claimed in claim 1, wherein the carrier substrate is a polymeric film, paper, laminates of paper and polymeric films, glass, cloth, or metal.

3. The method claimed in claim 2, wherein the substrate is polyethylene terephthalate (PET), polyethylene naphthalate (PEN), polystyrene, or cellulose triaceate.

4. The method claimed in claim 1, wherein the carrier substrate is textured to provide a textured surface on the microfilm.

5. The method claimed in claim 1, wherein the diffusing microfilm has a dry thickness of less than 500 µm.

6. The method claimed in claim 5, wherein the thickness is 1.3 µm.

7. The method claimed in claim 1, wherein the step of coating is a tandem coating process.

8. The method claimed in claim 1, wherein the coating fluid comprises a polymeric resin in a solvent.

9. The method claimed in claim 8, wherein the coating fluid polymeric resin comprises polyvinyl alcohol, polyvinylbutyral, acrylic, polystyrene, cellulosic polymer, polycarbonate, and polyarylate, polyolefin, fluoroplastic, or sulfone polymer.

10. The method claimed in claim 8, wherein the solvent comprises chlorinated solvent, alcohol, ketone, ester solvent, aromatic solvent, ether solvent, water or a blend thereof.

11. The method claimed in claim 8, wherein the coating fluid contains a converting aid comprising a plastisizer or surfactant.

12. The method claimed in claim 11, wherein the plastisizer is a phthalate ester, an adipate ester, a phosphate ester, a polyhydric alcohol, or an amine alcohol.

13. The method claimed in claim 11, wherein the surfactant is a siloxane compound, or a fluorochemical compound.

14. The method claimed in claim 1, wherein the coating fluid includes titanium dioxide particles.

15. The method claimed in claim 14, wherein the titanium dioxide particles have an average particle size of 0.3 microns.

16. A method of making a microfilm having a textured surface, comprising:
    providing a carrier substrate;
    coating a film forming coating fluid onto the carrier substrate, the film forming coating liquid containing solid particles;
    drying the film forming coating fluid on the carrier substrate to form a releasable microfilm having a textured surface defined by the solid particles, winding the composite of carrier and microfilm into a roll, storing the microfilm on the carrier substrate and separating it from the carrier substrate prior to use, wherein the step of coating the film is a simultaneous multi-layer coating process including a particle free uppermost layer to control the texture of the surface of the microfilm.

17. The method claimed in claim 16, wherein the carrier substrate is a polymeric film, paper, laminates of paper and polymeric films, glass, cloth, or metal.

18. The method claimed in claim 17, wherein the polymeric film is polyethylene terephthalate (PET), polyethylene naphthalate (PEN), polystyrene, or cellulose triaceate.

19. The method claimed in claim 16, wherein the solid particles are titanium dioxide.

20. The method claimed in claim 16, wherein the microfilm has a dry thickness of less than 500 μm.

21. The method claimed in claim 20, wherein the thickness is 1.3 μm.

22. The method claimed in claim 16, wherein the step of coating the film is a tandem coating process including a particle free uppermost layer to control the texture of the surface of the microfilm.

23. The method claimed in claim 16, wherein the film forming coating fluid comprises a polymeric resin in a solvent.

24. The method claimed in claim 23, wherein the coating fluid polymeric resin comprises polyvinyl alcohol, polyvinylbutyral, acrylic, polystyrene, cellulosic polymer, polycarbonate, and polyarylate, polyolefin, fluoroplastic, or sulfone polymer.

25. The method claimed in claim 23, wherein the solvent comprises chlorinated solvent, alcohol, ketone, ester solvent, aromatic solvent, ether solvent water or a blend thereof.

26. The method claimed in claim 16, wherein the film forming coating fluid contains a converting aid comprising a plastisizer or surfactant.

27. The method claimed in claim 26, wherein the plastisizer is a phthalate ester, an adipate ester, a phosphate ester, a polyhydric alcohol, or an amine alcohol.

28. The method claimed in claim 26, wherein the surfactant is a siloxane compound, or a fluorochemical compound.

* * * * *